(12) United States Patent
Arakawa et al.

(10) Patent No.: US 7,286,303 B2
(45) Date of Patent: Oct. 23, 2007

(54) MACRO LENS

(75) Inventors: Akio Arakawa, Saitama (JP); Yuichi Muramatsu, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 0 days.

(21) Appl. No.: 11/156,543

(22) Filed: Jun. 21, 2005

(65) Prior Publication Data

US 2006/0285230 A1 Dec. 21, 2006

(51) Int. Cl.
*G02B 9/00* (2006.01)
*G02B 9/60* (2006.01)

(52) U.S. Cl. ...................... 359/754; 359/763
(58) Field of Classification Search ............... 359/754, 359/763, 770, 693, 705
See application file for complete search history.

(56) References Cited

U.S. PATENT DOCUMENTS

| | | | | |
|---|---|---|---|---|
| 4,786,153 A | 11/1988 | Ogata | ......................... | 359/755 |
| 4,871,243 A | 10/1989 | Ogawa et al. | ............... | 359/754 |
| 4,923,292 A | 5/1990 | Matsuo | ....................... | 359/754 |
| 6,437,926 B2 * | 8/2002 | Mori | ......................... | 359/755 |
| 6,747,817 B2 * | 6/2004 | Takato | ....................... | 359/794 |

FOREIGN PATENT DOCUMENTS

| | | |
|---|---|---|
| JP | 62-160412 A | 7/1987 |
| JP | 62-195617 A | 8/1987 |
| JP | 63-247713 A | 10/1988 |
| JP | 01-214812 A | 8/1989 |
| JP | 06-308386 A | 11/1994 |
| JP | 07-181389 A | 7/1995 |
| JP | 07-181390 A | 7/1995 |
| JP | 2003-185916 A | 7/2003 |

\* cited by examiner

*Primary Examiner*—Scott J. Sugarman
*Assistant Examiner*—William C Choi
(74) *Attorney, Agent, or Firm*—Jacobson Holman PLLC

(57) ABSTRACT

The invention discloses a macro lens that takes a retrofocusing function for the purpose of downsizing. The macro lens employs a floating mechanism to cover a wide photographing range from the equi-magnification to the infinity, and especially, attains a great imaging performance by appropriately compensating for spherical aberration, comatic aberration, and chromatic aberration of magnification. The macro lens comprised of first to fifth lenses in the order closer to the object; that is, the first lens serving as a negative meniscus lens with a convex surface oriented to the object, the fourth lens as a negative lens with a concave surface of great curvature oriented to the image plane, and the fifth lens as a negative lens with a surface of great curvature oriented to the object. The macro lens satisfies conditions as expressed in the following formulae:

$$0.6 \leq F1/F \leq 1.3 \tag{1}$$

$$0.9 \leq F4/F5 \leq 1.5 \tag{2}$$

where F is a focal length of the entire lens system, F1 is a focal length of the first lens, F4 is a focal length of the fourth lens, and F5 is a focal length of the fifth lens.

1 Claim, 3 Drawing Sheets

MACRO LENS

FIELD OF THE INVENTION

The present invention relates to a macro lens, and more particularly, to a retrofocusing macro lens that utilizes floating and is incorporated in a 35 mm film photographing camera, a video camera, an electronic still camera, a broadcasting TV camera, and the like.

BACKGROUND ART

In ordinary lenses other than the macro lens, a point of the reference in correcting aberration is located in infinitive far while macro lens compensate for aberration based upon the reference of proximal distance. Such a macro lens, however, is used considerably frequently for ordinary photographing, and it is desirable that the macro lens should fully cover an aberration correcting range from the ultimate proximal distance to the infinitive far.

A first embodiment of the prior art technology developed under these circumstances is a macro lens that employs a floating mechanism adapted to move at least two groups of lenses independent of each other during the focusing so as to cover a wide photographing range from the infinity to the equi-magnification (See Patent Document 1 and Patent Document 2 listed below, for example).

A second embodiment disclosed in the prior art technology is a macro lens that features a longer backfocus than its focal length by virtue of the first group of lenses of a retrofocusing type (See Patent Document 3 and Patent Document 4 listed below). Commercially available examples of this type include Pentax FA Macro 50 mm, F 2.8 from Asahi Optical Co., Ltd. (currently renamed as Pentax Corporation).

A third embodiment of the prior art technology currently commercially available is a reduced focal length macro lens capable of close-up shooting of an object in the proximal range but not in the range of infinity. For instance, available are AF Macro Zoom 3×-1×, F 1.7-2.8 from Konica Minolta, Inc., and Zuiko 20 mm, F 2 from Olympus Corp.

List of Cited Patent Documents:
Document 1
Japanese Provisional Patent Publication No. SHO62-195617
Document 2
Japanese Provisional Patent Publication No. SHO63-247713
Document 3
Japanese Provisional Patent Publication No. SHO62-160412
Document 4
Japanese Provisional Patent Publication No. H01-214812

The 35 mm film photographing lens is currently used not only for 35 mm film but also for optical apparatuses such as a digital still camera which charge coupled devices or CCDs dimensioned as small as 23.7 mm×15.6 mm are built in. In creating a picture this small, a focal length must be reduced so as to make the same angle of view as that of the photographing lens for the 35 mm film.

However, the macro lens utilizing the floating mechanism of the aforementioned first embodiment of the prior art is designed based upon a Gaussian lens, and as a consequence, the backfocus cannot be longer than the focal length that can be hardly shorter than about 50 mm. Hence, this type of macro lens has not been implemented as real products.

The second prior art embodiment is of retrofocusing type, and therefore, the lens structure is devised so as to cover a wide photographing range from the infinity to the equi-magnification, and especially, to minimize a variation in aberration. For that purpose, radii of curvature of the third group of lenses, r5 and r6, are not so different from each other, and a Z value indicating the norm for the centering of the lenses is small. As a result, precision in machining and accuracy of eccentricity greatly affect the entire lens system, and use of components manufactured with sufficient precision and accuracy brings about an adverse increase in the manufacturing cost.

The third prior art embodiment is a macro lens of the reduced focal length serving as a photographing lens only for close-up shooting of the object in the proximal range, which means the use of the lens is limited to this specific purpose. This macro lens is highly disadvantageous in that it is not suitable to take a picture of the object in the infinity range and does not meet the most common requirement.

The present invention is made to overcome the aforementioned disadvantaged in the macro lenses of the prior art, and accordingly, it is an object of the present invention to provide the one that takes a retrofocusing function for the purpose of downsizing, employs a floating mechanism to cover a wide photographing range from the equi-magnification to the infinity, and especially, attains a great imaging performance by appropriately compensating for spherical aberration, comatic aberration, and chromatic aberration of magnification.

SUMMARY OF THE INVENTION

The present invention is directed to a macro lens comprised of first to fifth lenses in the order closer to the object, the first lens being a negative meniscus lens with a convex surface oriented to the object, the fourth lens being a negative lens with a concave surface of great curvature oriented to the image plane, and the fifth lens being a negative lens with a concave surface of great curvature oriented to the object, the macro lens satisfying conditions as expressed in the following formulae:

$$0.6 \leq F1/F \leq 1.3 \tag{1}$$

$$0.9 \leq F4/F5 \leq 1.5 \tag{2}$$

where F is a focal length of the entire lens system, F1 is a focal length of the first lens, F4 is a focal length of the fourth lens, and F5 is a focal length of the fifth lens.

The present invention is also directed to a macro lens that includes at least a single group or a first group of lenses comprised of a negative lens with a convex surface oriented to the object, a negative lens with a concave surface of great curvature oriented to the image plane, and a negative lens with a surface of great radius oriented to the object in the order closer to the object, the macro lens satisfying conditions as expressed in the following formulae:

$$0.6 \leq F1/F \leq 1.3 \tag{1}$$

$$0.9 \leq F4/F5 \leq 1.5 \tag{2}$$

where F is a focal length of the entire lens system, F1 is a focal length of the negative lens with the convex surface oriented to the object, F4 is a focal length of the negative lens with the concave surface of great radius oriented to the image plane, and F5 is a focal length of the negative lens with the surface of great radius oriented to the object.

The macro lens according to the present invention further includes a second lens group of negative and positive lenses following the first lens group and closer to the image plane.

In the macro lens comprised of first and second groups of lenses according to the present invention, the first lens group includes, in combination in the order closer to the object, a fore lens serving as a negative meniscus lens with a convex surface oriented to the object, a first back lens serving as a negative lens with a concave surface of great radius oriented to the image plane, and a second back lens serving as a negative lens with a surface of great radius oriented to the object, the second lens group includes at least negative and positive lenses in combination, upon focusing from the infinity to the proximal distance, both the first and second lens groups move towards the object while being relatively separated from each other, and the macro lens satisfies conditions as expressed in the following formulae:

$$0.6 \leq F1/F \leq 1.3 \tag{1}$$

$$0.9 \leq F4/F5 \leq 1.5 \tag{2}$$

where F is a focal length of the entire lens system, F1 is a focal length of the fore lens, F4 is a focal length of the first back lens, and F5 is a focal length of the second back lens.

The macro lens according to the present invention also satisfies conditions as expressed in the following formulae:

$$4.0 \leq F2/F \leq 6.0 \tag{3}$$

where F2 is a focal length of the second lens group.

The macro lens according to the present invention has the second lens group increased in refractivity to reduce a displacement of the lenses, and optimizes the focal length of the second lens group so as to reduce the aberration resulted from the increased refractivity.

In the macro lens according to the present invention, the ratio expressed by F1/F is a refractivity appropriately determined to make the negative lens with the convex surface function as a retrofocusing component while the backfocus is ensured in this range of the refractivity, so as to control variations in the aberration along with the varied focal length depending upon the refractivity.

In the macro lens according to the present invention, the refractivity of the lens groups is determined to have an appropriate back focus, thereby controlling variations in the aberration along with the varied focal length.

The macro lens according to the present invention is formed in a floating mechanism where the entire lens system is divided into two groups or the first and second groups of lenses, and the first lens group is of retrofocusing lens system.

The present invention also provides a macro lens comprised of first and second groups of lenses;

the first lens group including first to ninth lenses in combination in the order closer to the object, the first lens being a negative meniscus lens with a convex surface oriented to the object, the second lens being in combination with the first lens and serving as a positive lens with a convex surface oriented to the object, the third lens being a positive lens with a convex surface oriented to the object, the fourth lens being a negative lens with a concave surface of great radius oriented to the image plane, the fifth lens having a concave surface of great radius oriented to the object to serve as a negative lens and also having a convex surface of great radius oriented to the image plane, the fifth lens being joined to the sixth lens, and the seventh lens being a positive lens with a convex surface of great radius oriented to the image plane; the second lens group including eighth and ninth lenses in combination, the eighth lens being a roughly negative meniscus lens with a convex surface lower in radius than that of the first lens oriented to the object, and the ninth lens being a positive lens; and upon focusing from the infinity to the proximal distance, both the first and second lens groups move towards the object while being relatively separated from each other.

In the macro lens according to the present invention, the first lens group is comprised of at leas the first, fourth and fifth lenses, and the macro lens satisfies conditions as expressed in the following formulae:

$$0.6 \leq F1/F \leq 1.3 \tag{1}$$

$$0.9 \leq F4/F5 \leq 1.5 \tag{2}$$

where F is a focal length of the entire lens system, F1 is a focal length of the first lens, F4 is a focal length of the fourth lens, and F5 is a focal length of the fifth lens.

The macro lens according to the present invention satisfies conditions as expressed in the following formulae:

$$4.0 \leq F2/F \leq 6.0 \tag{3}$$

where F2 is a focal length of the second lens group (back lens group).

The formula (1) defines the refractivity of the first lens serving as a retrofocusing component. Exceeding the lower limit as expressed in the formula, optical beam divergence is weakened, and this makes it difficult to ensure the backfocus. Reverse to this, exceeding the upper limit causes the refractivity of the first lens to be enhanced, and this is prone to prevent the lens system from satisfactorily controlling variations in the spherical aberration and comatic aberration along with the varied focal length.

The formula (2) defines a symmetric property of the negative lenses before and after the aperture stop as well as the retrofocusing. Exceeding the lower limit as expressed in the formula, it is hard to compensate for the comatic aberration developed in the first lens. Exceeding the upper limit, it is hard to compensate for the comatic aberration and the chromatic aberration of magnification. The range of the refractivity as defined in the formula is desirable to ensure a Z value of the fourth lens and not to be affected by the eccentricity of the fourth lens, as well.

The formula (3) defines the refractivity of the second group of lenses to control the displacement of the lenses. Exceeding the lower limit of the refractivity as expressed in the formula causes refraction to be negatively enhanced, and the displacement of the lenses under keeping the floating condition is reduced, which resultantly leads to a reduction of the total length of the lenses. Along with the downsizing of the lens, portability of the lens is improved, but it becomes hard to compensate for the distortion aberration developed in the second group of lenses. The lens system as a whole has an effective focal length to attain a wide-angle, and thus, it is difficult to compensate for curvature of the peripheral image. Exceeding the upper limit, the displacement of the lenses is increased, and this brings about an increase in the total length of the lenses and also in a diameter of the fore group of lenses.

The macro lens of the present invention, as mentioned above, is designed to be the retrofocusing type to downsize, utilizes the floating mechanism to attain its performability to photograph in a wide range from the equi-magnification to the infinity, and especially, appropriately compensate for the comatic aberration and the chromatic aberration of magnification to enhance an imaging capability.

BEST MODE OF THE INVENTION

Figure 1:
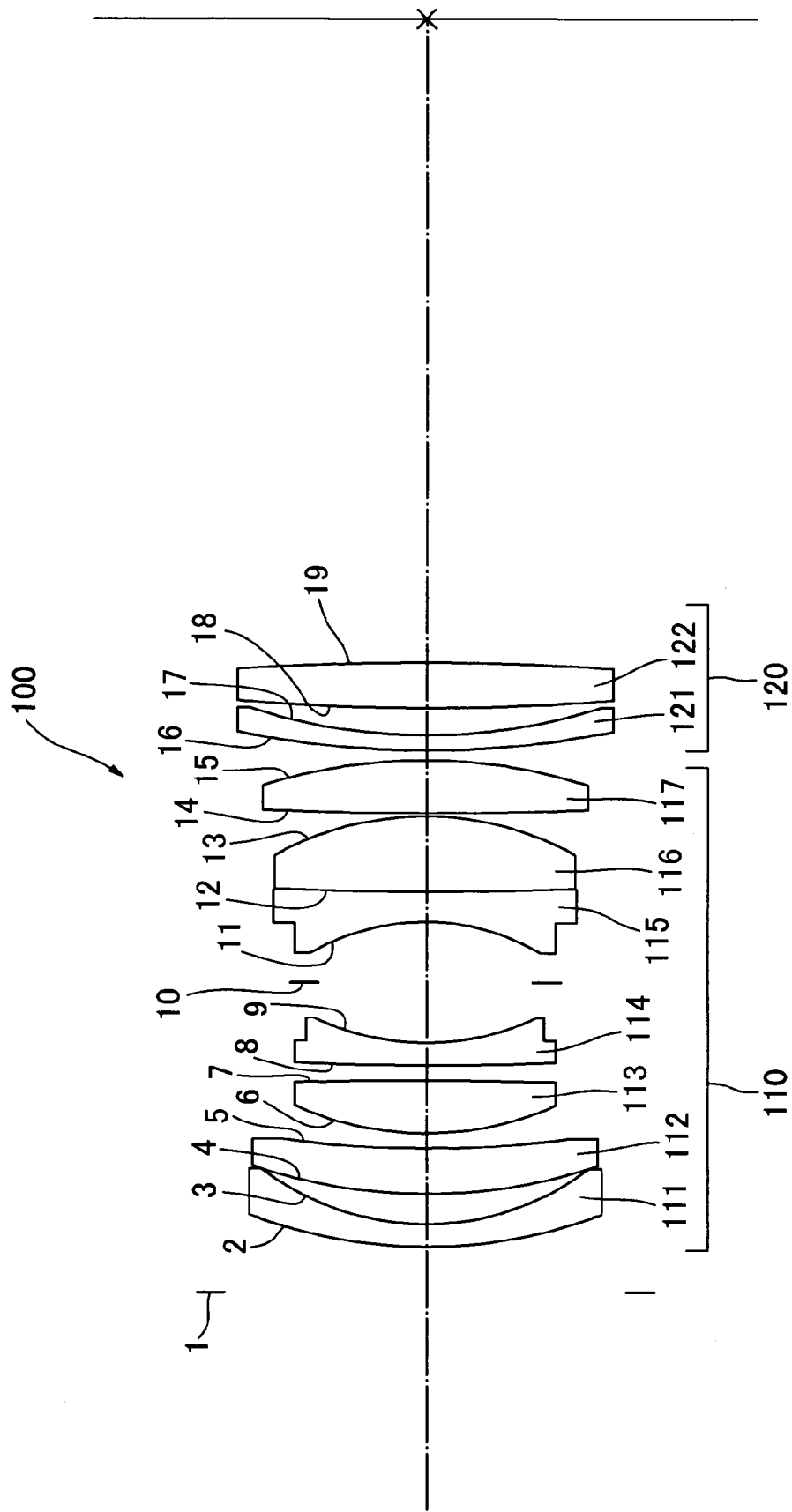
FIG. 1 depicts an optical module of an exemplary macro lens in accordance with the present invention.

Preferred embodiments of a macro lens according to the present invention will now be described in conjunction with the accompanying drawings. A macro lens 100 is comprised of first and second groups of lenses, and the first lens group 110 includes lenses 111 and 117 while the second lens group 120 includes lenses 121 and 122. The macro lens 100 is 45.3 mm in focal length f and 2.8 in numerical aperture F.

More specifically, the first lens group 110 of the macro lens 100 serves a fore lens group which consists of at least first to seventh lenses in combination in the order closer to the object; that is, the first lens 111 is a negative meniscus lens with its convex surface 2 oriented to the object, the second lens 112 is in combination with the first lens and serves as a positive lens with its convex surface 4 oriented to the object, the third lens 113 is a positive lens with its convex surface 6 oriented to the object, the fourth lens 114 is a negative meniscus lens 114 with its concave surface 9 of great curvature oriented to the image plane, the fifth lens 115 is a negative lens of great curvature with its concave surface 11 of great curvature oriented to the object, the sixth lens 116 is joined to the fifth lens 115 in a junction 12 and serves as a positive lens with its convex surface 13 of great curvature oriented to the image plane, and the seventh lens 117 is a positive lens 117 with its convex surface 15 of great curvature oriented to the image plane.

As can be seen in FIG. 1, the first and second lenses are separated with an air gap around the optical axis (denoted by dashed dotted line) between the concave surface 3 of the negative meniscus lens 111 and the convex surface 4 of the positive lens 112. The third positive lens 113 and the fourth negative lens 114 have their respective major surfaces 7 and 8 separated with a slight air gap between them where the surface 7 is oriented to the image plane while the surface 8 is oriented to the object. In addition, in an air gap between the greatly curved concave surface 9 of the fourth negative lens 114 and the greatly curved concave surface 11 of the fifth negative lens 115, an aperture stop 10 is placed. The first lens group 110, configured in such an arrangement, forms in a Gaussian lens system.

The remaining lenses or the second lens group 120 are located as a back lens group, which constitutes the macro lens along with the fore lens group. The second lens group 120 consists of eighth and ninth lenses in combination; that is, the eighth lens 121 is a roughly negative meniscus lens having a smaller in negative power than the first lens 111 while the ninth lens 122 is a positive lens. As will be recognized in FIG. 1, the back lens group or the second lens group 120 includes an eighth lens 121 serving as a negative meniscus lens and a ninth lens 122 as a positive lens in combination with an air gap between their respective major surfaces 17 and 18, and the surface 17 is a concave surface oriented to the image plane while the surface 18 is oriented to the object. Another major surface of the eighth roughly negative meniscus lens 121, which is a convex surface oriented to the object, has a smaller in negative power than that of the first lens.

The beam flux is diverged by the first lens or the negative lens 111, and the desired back focus can be ensured despite the reduced focal length of the lens system. The negative lens 111 and the second lens or the positive lens 112 together compensate for the worsening distortion aberration upon close-up photographing of the object in the proximal range. Additionally, the third lens 113 makes the lens structure symmetrical about the aperture stop between the fourth lens or the negative lens 114 and the fifth lens or the negative lens 115, and this is useful to compensate for the comatic aberration similar to the Gaussian lens system. In this way, upon focusing from the infinity to the proximal distance, both the first and second lens groups 10 and 120 move toward the object while being relatively separated from each other, and thus, the lens groups behave just as expected as the macro lens.

As to this macro lens, optical data are given as follows:

TABLE 1

| SURFACE # | RADIUS OF CURVATURE | THICKNESSWISE DISTANCE | REFRACTIVITY (Nd) | DISPERSION (ν d) |
|---|---|---|---|---|
| 1 | INF | 3.0 | | |
| 2 | 31.9956 | 1.5 | 1.69680 | 55.5 |
| 3 | 17.3927 | 2.0 | | |
| 4 | 35.0333 | 3.0 | 1.75520 | 27.5 |
| 5 | 70.9037 | 1.0 | | |
| 6 | 20.4157 | 3.5 | 1.72000 | 50.3 |
| 7 | −304.9499 | 1.0 | | |
| 8 | 200.0000 | 1.5 | 1.62004 | 36.3 |
| 9 | 16.6496 | 4.0 | | |
| 10 | stop | 4.0 | | |
| 11 | −14.6537 | 2.0 | 1.71736 | 29.5 |
| 12 | 233.3340 | 5.0 | 1.77250 | 49.6 |
| 13 | −20.0075 | 0.2 | | |
| 14 | 257.9798 | 3.5 | 1.72000 | 50.3 |
| 15 | −34.8265 | D (15) | | |
| 16 | 61.6658 | 1.0 | 1.72000 | 50.3 |
| 17 | 36.9213 | 1.8 | | |

TABLE 1-continued

| SURFACE # | RADIUS OF CURVATURE | THICKNESSWISE DISTANCE | REFRACTIVITY (Nd) | DISPERSION (v d) |
|---|---|---|---|---|
| 18 | 147.6397 | 3.0 | 1.54072 | 47.2 |
| 19 | −182.6472 | D (19) | | |

The lens distances D (15) and D (19) are given as follows:

TABLE 2

| LENS DISTANCE | INFINITY FOCUS | EQUI-MAGNIFICATION FOCUS |
|---|---|---|
| D (15) | 0.669 | 21.832 |
| D (19) | 42.605 | 63.767 |

Figure 2:
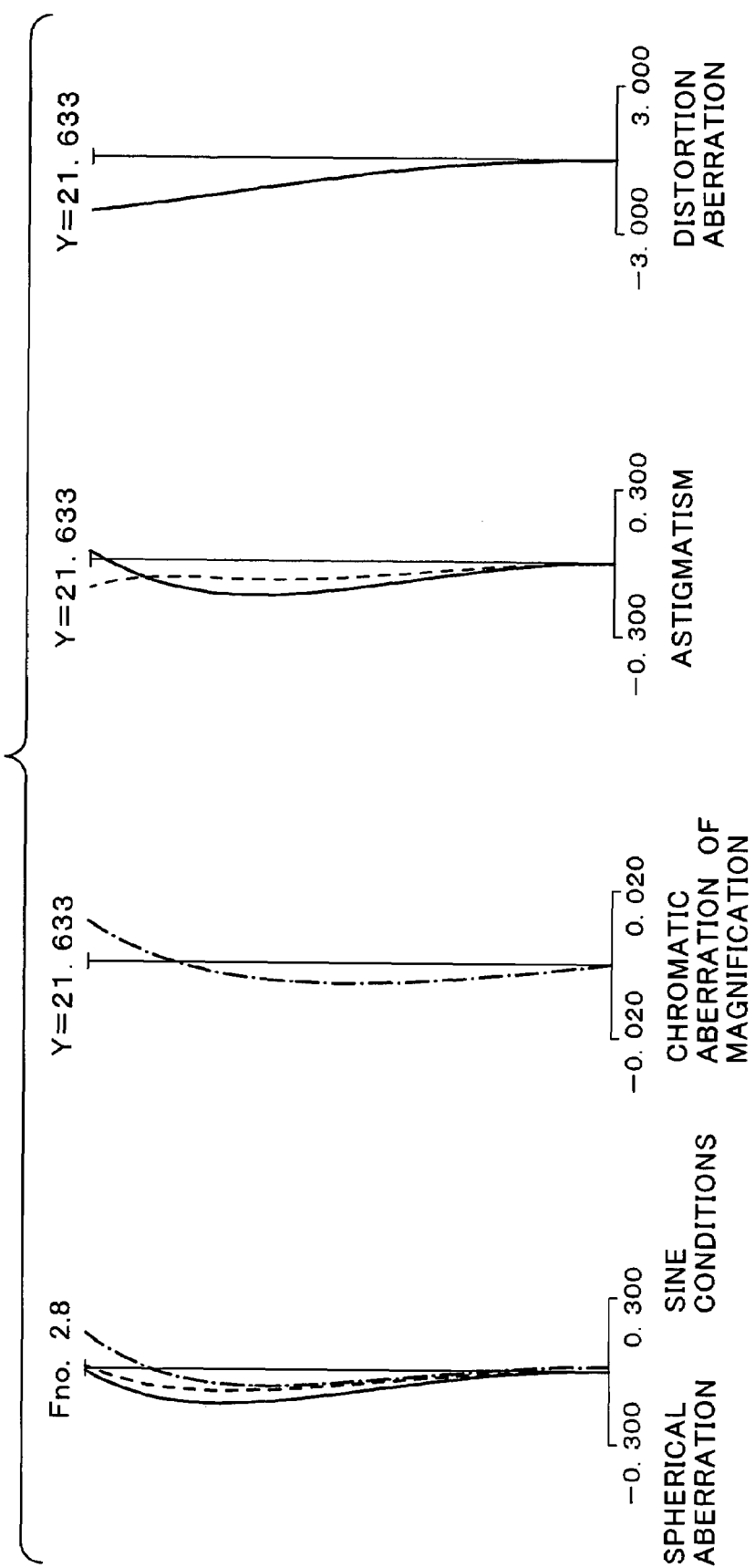
FIG. 2 illustrates an aberration upon the focusing in the infinity range in the exemplary macro lens according to the present invention.

The aberrations of the aforementioned exemplary macro lens will be detailed below. Spherical aberration, sine conditions, chromatic aberration of magnification, and distortion aberration upon focusing in the infinity range are illustrated in FIG. 2. All those upon focusing in the equi-magnification imaging range are illustrated in FIG. 3.

Referring to FIG. 2 where Y=21.633 represents a height of the image, the distortion aberration is depicted by solid curve of property. As for the astigmatism, the one which belongs to the sagittal plane is denoted by solid curve of property while the one which belongs to the meridian plane is denoted by broken curve of property. The chromatic aberration of magnification is represented by dashed dotted curve of property. Fno=2.8 is an F number. Regarding the spherical aberration, solid curve of property expresses the one under the condition of λ=87.56 nm while dashed dotted curve of property represents the one under the condition λ=84 nm. The sine conditions are expressed by broken curve of property.

Figure 3:
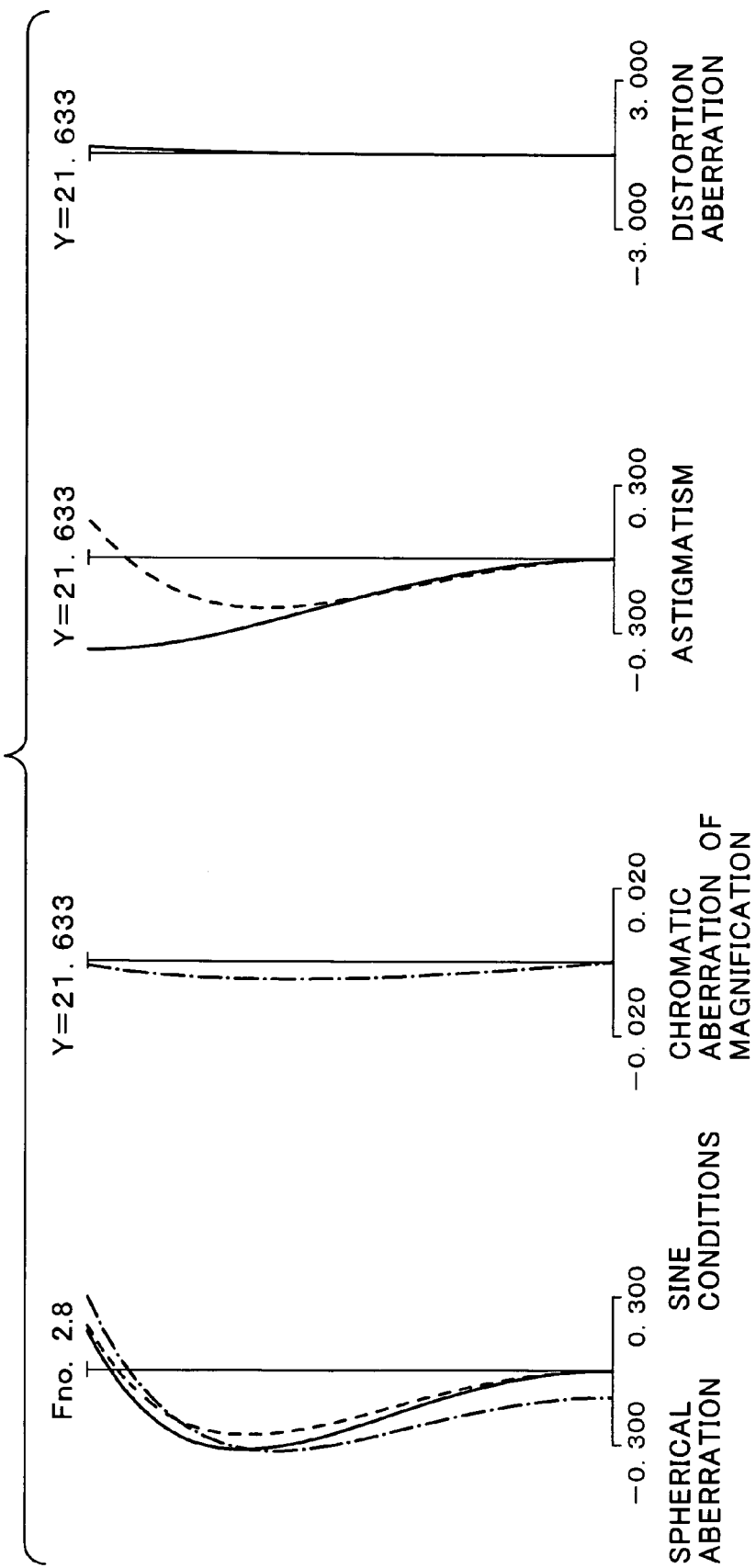
FIG. 3 illustrates the aberration upon the focusing in the equi-magnification range in the exemplary macro lens according to the present invention.

FIG. 3 depicts the same in the manner similar to FIG. 2.

It is not intended to limit the present invention to the precise forms as described in the aforementioned preferred embodiments. For example, the disclosed embodiment (where the air gap is provided around the optical axis between the concave surface 3 of the first lens or the negative meniscus lens 111 and the convex surface 4 of the second lens of the positive lens 112 with the concave surface 3 and the convex surface 4 meeting at their respective peripheral edges) can be replaced with an alternative arrangement where the air gap is provided without the peripheral contact of the concave surface 3 with the convex surface 4. Various modifications can be made, if appropriate and desired, to the remaining lenses.

What is claimed is:

1. A macro lens comprised of first to fifth lenses in the order closer to the object, the first lens being a negative meniscus lens with a concave surface oriented to the object, the fourth lens being a negative meniscus lens with a concave surface having an absolute value of the radius of curvature greater than 16.6 oriented to the image plane, and the fifth lens being a negative lens with a concave surface having an absolute value of the radius of curvature greater than 14.6 oriented to the object; the macro lens satisfying conditions as expressed in the following formulae:

$$0.6 \leq |F1/F| \leq 1.3 \tag{1}$$

$$0.9 \leq F4/F5 \leq 1.5 \tag{2}$$

where F is a focal length of the entire lens system, F1 is a focal length of the first lens, F4 is a focal length of the fourth lens, and F5 is a focal length of the fifth lens.

* * * * *